(12) United States Patent
Louette

(10) Patent No.: US 12,313,117 B2
(45) Date of Patent: May 27, 2025

(54) BEARING DEVICE, AND ASSOCIATED MACHINE AND METHOD

(71) Applicant: Aktiebolaget SKF, Gothenburg (SE)

(72) Inventor: Benoit Louette, Saint Genough (FR)

(73) Assignee: Aktiebolaget SKF, Gothenburg (SE)

( * ) Notice: Subject to any disclaimer, the term of this patent is extended or adjusted under 35 U.S.C. 154(b) by 98 days.

(21) Appl. No.: 18/458,305

(22) Filed: Aug. 30, 2023

(65) Prior Publication Data
US 2024/0093734 A1 Mar. 21, 2024

(30) Foreign Application Priority Data
Sep. 9, 2022 (DE) .................. 102022209407.7

(51) Int. Cl.
*F16C 19/52* (2006.01)
*F16C 19/06* (2006.01)
*G01M 13/045* (2019.01)

(52) U.S. Cl.
CPC ............ *F16C 19/527* (2013.01); *F16C 19/06* (2013.01); *G01M 13/045* (2013.01); *F16C 2233/00* (2013.01)

(58) Field of Classification Search
CPC .... F16C 19/06; F16C 19/527; F16C 2233/00; G01M 13/045
See application file for complete search history.

(56) References Cited

U.S. PATENT DOCUMENTS

| | | | | |
|---|---|---|---|---|
| 2016/0005244 A1* | 1/2016 | Bell | ............. | G01M 13/04 |
| | | | | 701/29.1 |
| 2020/0256766 A1* | 8/2020 | Li | ............. | G01H 1/003 |
| 2021/0325277 A1* | 10/2021 | Gouda | ............. | F16C 19/52 |

\* cited by examiner

*Primary Examiner* — Phillip A Johnson
(74) *Attorney, Agent, or Firm* — Stinson LLP

(57) ABSTRACT

A bearing device includes a bearing provided with an inner ring and an outer ring that rotate concentrically relative to one another. A vibration sensor measures vibrations of the bearing. The bearing device includes a first determining means (10) for determining values of at least a first statistical parameter and a second statistical parameter (P1, P2, P3, P4, P5, P6), a modelling means (11) for modelling the values of the first and statistical parameters with normal distributions, a second determining means (12) for determining a detection threshold (Sd) from the normal distributions during the training period, a third determining means (13) for determining a score (Sc) during normal operation of the machine (1) from the values of the two statistical parameters and the normal distributions, and a comparing means (14) for determining the failure of the bearing (4) from the detection threshold (Sd) and the score (Sc).

17 Claims, 4 Drawing Sheets

BEARING DEVICE, AND ASSOCIATED MACHINE AND METHOD

CROSS-REFERENCE TO RELATED APPLICATION

This application claims priority to German Application No. 102022209407.7, filed Sep. 9, 2022, the entirety of which is hereby incorporated by reference.

FIELD

The present disclosure is directed to a bearing device and a method for monitoring a bearing device in a machine.

More particularly, the present disclosure deals with the determination of a failure of a bearing of the bearing device.

BACKGROUND

A machine, for example a truck comprises a plurality of axles.

Each axle is supported by bearings.

The bearings are monitored to detect a failure of the bearings.

Generally, each bearing is provided with a vibration sensor delivering a signal representative of the vibrations of the said bearing.

A spectral analysis is performed on the signal using for example a fast Fourier analysis to get a spectrum to identify harmonics representative of defects of the bearing for example a defect on the raceway of the inner ring of the bearing.

However, some defects of the bearing are not identified from the spectrum.

Consequently, the present disclosure intends to enhance the detection of a failure of a bearing from vibration measurements.

SUMMARY

According to an aspect, a method for determining a method for monitoring a bearing device in a machine, the bearing device comprising a bearing provided with an inner ring and with an outer ring capable of rotating concentrically relative to one another, and a vibration sensor measuring vibrations of the bearing.

The method comprises the following steps:
a. determining values of at least a first statistical parameter and a second statistical parameter from at least one set of vibration measurements delivered by the sensor during a training period following the implementation of the sensor in the machine and when the rotation speed of one of the inner and outer rings relative to the other is included in a predetermined interval,
b. modelling the values of the first statistical parameter with a first normal distribution and modelling the values of the second statistical parameter with a second normal distribution during the training period,
c. determining a detection threshold from the first and second normal distributions during the training period,
d. determining a first value of the first statistical parameter and a second value of the second statistical parameter from a set of vibration measurements delivered by the sensor during normal operation of the machine and when the rotation speed of the said one ring is included in a predetermined interval,
e. determining a score during normal operation of the machine from the values of the two statistical parameters, the first and second normal distributions,
f. comparing the score to the detection threshold, and
g. determining the failure of the bearing according to the result of the comparison.

The method permits early prediction of damage of the bearing by determining several statistical parameters from recorded vibration measurements of the bearing by analysing the evolution of these parameters.

As several statistical parameters are used to predict a failure of the bearing, different kinds of defects of the bearing may be detected.

Moreover, the detection threshold is determined from vibration measurements measured on the bearing in the machine permitting to define the said threshold depending on the application of the machine to get an accurate monitoring of the bearing.

Advantageously, the values of at least a first statistical parameter and a second statistical parameter are determined during the training period and during normal operation of the machine if the kurtosis of the set of vibration measurements is smaller than a predetermined kurtosis threshold when the machine is a mobile machine.

Preferably, the steps (d), (e), (f), (g) are repeated at a predetermined duration.

Advantageously, determining a detection threshold comprises summing the values of the first and second distributions included in a first interval having a lower bound equal to one minus a predetermine first quantile, the detection threshold being equal to the sum.

Preferably, determining a score comprises:
performing Z-Score normalization of the first value from the mean value and the variance of the first normal distribution to obtain a first standardized value,
performing Z-Score normalization of the second value from the mean value and the variance of the second normal distribution to obtain a second standardized value, and
summing the values of first and second standardized values included in a second interval having a lower bound equal to one minus a predetermine second quantile, the sum being equal to the score.

Advantageously, comparing the score to the detection threshold comprises comparing the score to the detection threshold minus the number of standardized value included in the second interval.

Preferably, the bearing is considered defective when the score is greater than the detection threshold.

Advantageously, each statistical parameter comprises:
the root means square of the set of vibration measurements, or
the sum of areas of identical squares, each square being defined by a diagonal connecting two vibration measurements of the set of vibration measurements, or
the dispersion entropy of the set of measurements, or
the permutation entropy of the set of measurements, or
the mean value of a predetermined number of most powerful harmonics of a spectrum of the set of measurements, the first and second statistical parameters being different.

Preferably, the method further comprises defining a third statistical parameter equal to the square of the sum of the square of the first and second statistical parameters.

According to an aspect, a bearing device comprising a bearing provided with an inner ring and with an outer ring capable of rotating concentrically relative to one another, and a vibration sensor measuring vibrations of the bearing, is proposed.

The bearing device further comprises:

first determining means for determining values of at least a first statistical parameter and a second statistical parameter from vibration measurements delivered by the sensor when the rotation speed of one of the inner and outer rings relative to the other ring is included in a predetermined interval, modelling means for modelling the values of the first statistical parameter with a first normal distribution and modelling the values of the second statistical parameter with a second normal distribution during a training period following the implementation of the sensor in the machine, second determining means for determining a detection threshold from the first and second normal distributions during the training period, third determining means for determining a score during normal operation of the machine from the values of the two statistical parameters, the first and second normal distributions, and comparing means for comparing the score to the detection threshold and for determining the failure of the bearing according to the result of the comparison.

According to another aspect, a machine comprising a bearing device as defined above is proposed.

BRIEF DESCRIPTION OF THE DRAWINGS

Other advantages and features of the present disclosure will appear on examination of the detailed description of embodiments, in no way restrictive, and the appended drawings in which.

DETAILED DESCRIPTION

Figure 1:
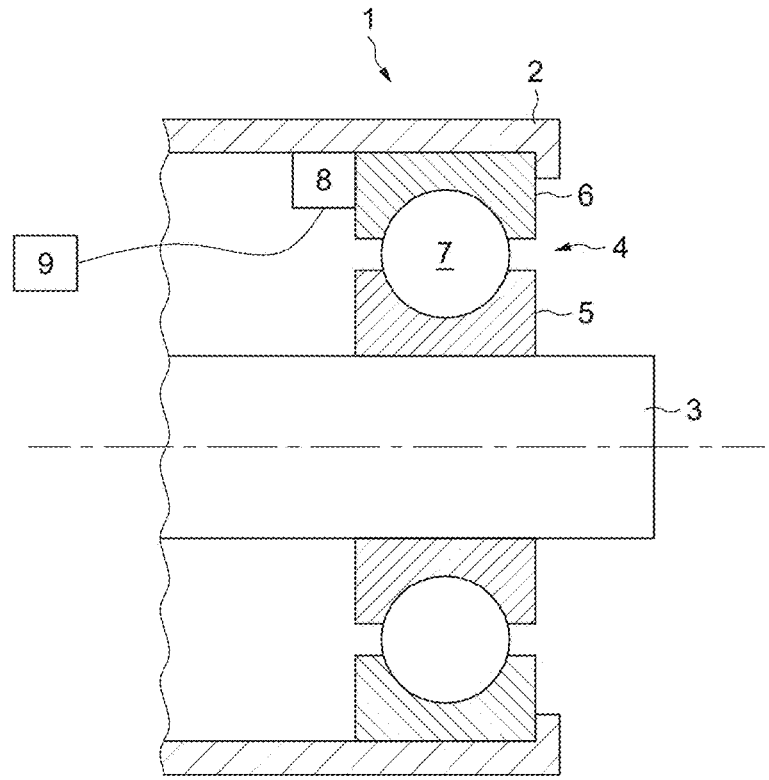
FIG. 1 illustrates schematically a rotating machine according to the present disclosure.

Reference is made to FIG. 1 which represents schematically a partial longitudinal cross section of a machine 1.

The machine 1 comprises a housing 2 and a shaft 3 supported in the housing 2 by a roller bearing 4.

The machine 1 may be a mobile machine, for example truck, the shaft 3 being an axle of the truck supported by the roller bearing 4.

In variant, the machine 1 may be a stationary machine, for example a machine tool.

The roller bearing 4 is provided with an inner ring 5 mounted on the shaft 3, and with an outer ring 6 mounted into the bore of the housing 2. The outer ring 6 radially surrounds the inner ring 5. The inner and outer rings 5, 6 rotate concentrically relative to one another.

The roller bearing 4 is further provided with a row of rolling elements 7 radially interposed between inner and outer raceways of the inner and outer rings 5, 6. In the illustrated example, the rolling elements 7 are balls. Alternatively, the roller bearing may comprise other types of rolling elements 7, for example rollers. In the illustrated example, the roller bearing comprise one row of rolling elements 7. Alternatively, the roller bearing 4 comprise may comprise several rows of rolling elements.

A sensor 8 is mounted in the housing 2 to measure the rotational speed of the bearing 4.

The sensor 8 may be mounted on a bore of the housing 2.

In variant, the sensor 8 may be mounted on the outer ring 6 or on the outer ring 6 and on the bore of the housing 2.

The sensor 8 delivers a signal representative of the vibrations of the bearing 4 to a monitoring device 9.

In variant, the sensor 8 is located in the monitoring device 9.

The bearing 4 and the monitoring device 9 form a bearing device.

Figure 2:
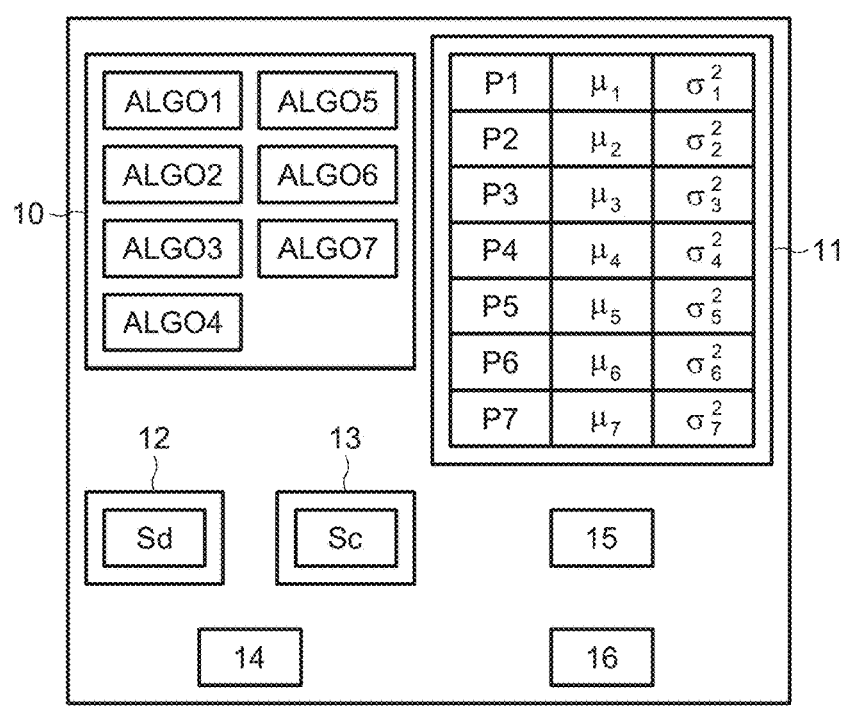
FIG. 2 illustrates schematically an example of a monitoring device for monitoring a bearing device according to the present disclosure.

FIG. 2 illustrates an example of the monitoring device 9.

The monitoring device 9 comprises first determining means 10 for determining values of at least two statistical parameters from the vibration measurements delivered by the sensor 8.

The monitoring device 9 further comprises modelling means 11, second determining means 12, third determining means 13, comparing means 14, a memory 15, and implementing means 16.

In variant, the memory is located outside the monitoring device 9.

It is assumed that the first determining means 10 implement six algorithms ALGO1, ALGO2, ALGO3, ALGO4, ALGO5, ALGO6.

Each algorithm ALGO1, ALGO2, ALGO3, ALGO4, ALGO5, ALGO6 determines a statistical parameter P1, P2, P3, P4, P5, P6 from a set of vibration measurements delivered by the sensor 8.

A set of vibration measurements comprises a predetermined number of samples xi of the signal delivered by the sensor 8, i being an integer varying between one and an integer M, M being for example equal to eight thousand samples.

The six statistical parameters P1, P2, P3, P4, P5, P6 are different one of each other.

For example, a first algorithm ALGO1 determines a first statistical parameter P1 equal to the root means square of the set of vibration measurements so that:

$$P1 = \sqrt{\frac{1}{N}\sum_{i=1}^{N} x_i^2} \quad (1)$$

A second algorithm ALGO2 and a third algorithm ALGO3 determine for example respectively a second statistical parameter P2 and a third statistical parameter P3 from the sum of areas of identical squares.

Each square is defined by a diagonal connecting two vibration measurements of the set of vibration measurements.

Figure 3:
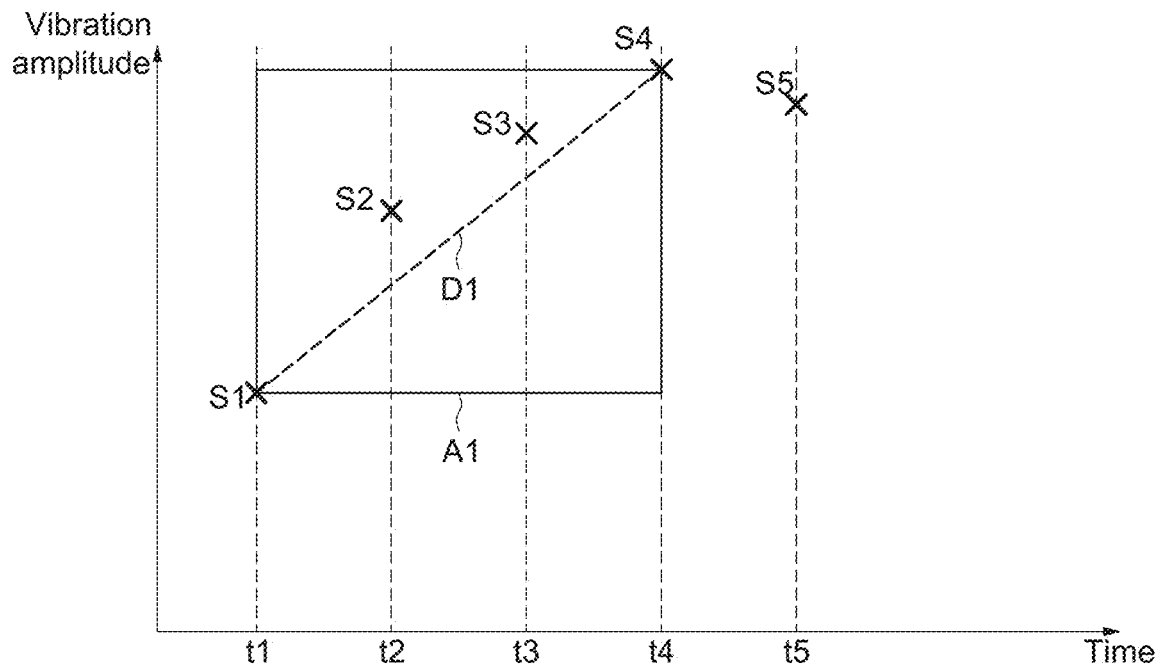
FIG. 3 illustrates schematically an example of a statistical parameter according to the present disclosure.

For example, the second statistical parameter P2 is equal to the sum of identical areas, each area A1 being defined by a diagonal D1 connecting a sample S1 of the set of measurements and a third sample S3 of the set of measurements following the said sample S1 as illustrated on FIG. 3, ti, i varying between 1 to M being the sampling time so that:

$$P2 = \sum_{j=1}^{M-3}(t_{j+3}-t_j)(S_{j+3}-S_j) \quad (2)$$

Figure 4:
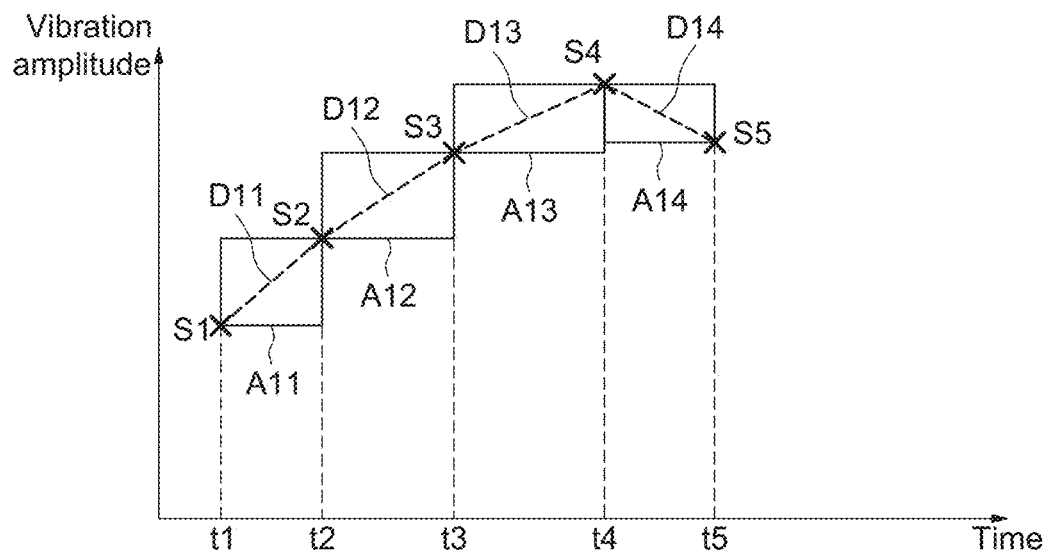
FIG. 4 illustrates schematically an example of another statistical parameter according to the present disclosure.

For example, the third statistical parameter P3 is equal to the sum of identical areas, each area A11, A12, A13, A14 being defined by a diagonal D11, D12, D13, D14 connecting a sample S1, S2, S3, S4 of the set of measurements and the next sample S2, S3, S4, S5 of the set of measurements following the said sample S1, S2, S3, S4 as illustrated on FIG. 4, so that:

$$P3 = \sum_{j=1}^{M-1}(t_{j+1}-t_j)(S_{i+1}-S_i) \quad (3)$$

A fourth algorithm ALGO4 determines a fourth statistical parameter P4 equal for example to the dispersion entropy of the set of measurements.

Document entitled "Dispersion Entropy: A measure for time series analysis", M. Rostaghi and H. Azami, IEEE Signal processing letters, vol. 23, n. 5, pp. 610-614, 2016 discloses an algorithm to determine the dispersion entropy value DE of a univariate signal X of length N, X={X1, X2, . . . , XN}, N being an integer.

The univariate signal X is for example equal to the set of vibration measurements comprises the predetermined number M of samples xi.

Figure 5:
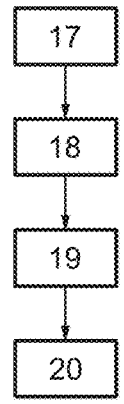
FIG. 5 illustrates schematically an algorithm to compute another statistical parameter.

The algorithm includes four main steps illustrated on FIG. 5.

During a step 17, the samples Xj of the univariate signal X, j varying from 1 to N are mapped to c classes, labelled from 1 to c.

The normal cumulative distribution function (NCDF) is used to map the univariate signal X into a signal Y={Y1, Y2, . . . , YN}.

For each sample Yj of the signal Y, j being an integer varying from 1 to N is defined a value $Z_j^c$ where:

$$Z_j^c = \text{round}(c \cdot Y_j + 0.5) \quad (4)$$

where the operator round( ) either increases or decreases a number to the next integer.

During a step 18, embedding vectors $z_k^{m,c}$ are created with m an embedding dimension so that each embedding vector $z_k^{m,c}$ is equal to a time series.

$$z_k^{m,c} = \{z_j^c, z_{j+d}^c, \ldots, z_{j+(m-1)d}^c\} \quad (5)$$

With d being a time delay and k varying between 1 and N−(m−1)d.

Then each time series $z_k^{m,c}$ is mapped to a dispersion pattern $\pi_{v_0 v_1 \ldots v_{m-1}}$, where $z_k^c = v_0$, $z_{k+d}^c = 1 \ldots z_{k+(m-1)d}^c = v_{m-1}$.

The number of possible dispersion patterns that may be assigned to each time series $z_k^{m,c}$ is equal to $c^m$, since the signal has m members and each member can be one of the integers from 1 to c.

During a step 19, for each of $c^m$ potential dispersion patterns, relative frequency is obtained as follows:

$$p(\pi_{v_0 v_1 \ldots v_{m-1}}) = \frac{\text{Number}\{i | i \leq N - (m-1)d, z_k^{m,c} \text{ has type } \pi_{v_0 v_1 \ldots v_{m-1}}\}}{N - (m-1)d} \quad (6)$$

where the operator Number( ) converts a value to a number.

$p(\pi_{v_0 v_1 \ldots v_{m-1}})$ shows the number of dispersion patterns $\pi_{v_0 v_1 \ldots v_{m-1}}$ that are assigned to $z_k^{m,c}$ divided by the total number of embedding signals with embedding dimension m.

During a step 20, the dispersion entropy value DE is determined:

$$DE(X,m,c,d) = -\sum_{\pi}^{c^m} p(\pi_{v_0 v_1 \ldots v_{m-1}}) \ln(p(\pi_{v_0 v_1 \ldots v_{m-1}})) \quad (7)$$

A fifth algorithm ALGO5 determines a fifth statistical parameter P5 equal for example to the permutation entropy of the set of measurements.

The document entitled "Efficiently measuring complexity on the basis of real-world data", V. A. Unakafova, K. Keller, Entropy, 15(10), 4392-4415.

The permutation entropy provides a quantification measure of the complexity of the vibration measurement by capturing the order relations between the values of the vibration measurements and extracting a probability distribution of ordinal patterns.

A sixth algorithm ALGO6 determines a sixth statistical parameter P6 equal for example to the mean value of a predetermined number of most powerful harmonics of a spectrum of the set of measurements.

For example, a fast Fourier algorithm is implemented to determine the spectrum of the set of measurements and the mean value is determined from the hundred most powerful harmonics of the spectrum.

A seventh parameter P7 is determined from a seventh algorithm ALGO7 implemented by the first determining means 10.

The seventh parameter P7 is for example equal to the square of the sum of the statistical parameters:

$$P7 = \sqrt{\sum_{k=1}^{6} Pk^2} \quad (8)$$

In the following, an example of a method implementing the monitoring device 9 is illustrated.

The method comprises a first part to determine a detection threshold Sd during a training period following the implementation of the sensor 8 in the machine 1, the detection threshold Sd being used to determine a failure of the bearing 4, and a second part to determine a failure of the bearing 4 during normal operation of the machine 1 following the training period.

Figure 6:
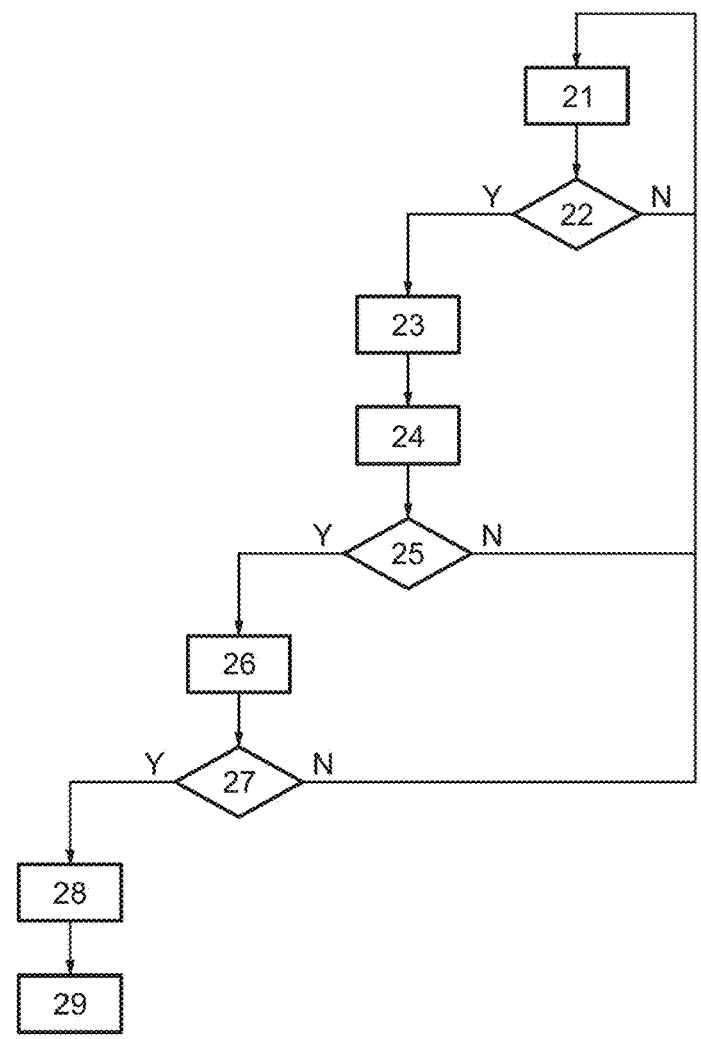
FIGS. 6 and 7 illustrate an example of a method for monitoring the bearing device according to the present disclosure.

FIG. 6 illustrates an example of the first part of the method.

It is assumed that one ring of the inner and outer rings 5, 6 rotates relative to the other ring of the inner and outer rings 6, 5.

During a step 21, the first part of the method is started when a predetermined duration between two consecutive method executions is reached.

The predetermined duration is for example equal to 24 hours so that the training period is executed once a day during for example one month following the implementation of the sensor 8 in the machine 1.

When the first part of the method is initialized (step 21), during a step 22, if the rotation speed of the said one ring is included in a predetermined interval, in a step 23, a set of vibration measurements comprising xi samples of the signal delivered by the sensor 8 are stored for example in the memory 15, i varying between one and the integer M.

M is for example equal to 8000 so that the set of vibration measurements comprises 8000 samples xi.

The predetermined interval is defined by a lower bound and an upper bound.

The value of the lower bound and the value of the upper bound are defined according to the type of the machine 1 (mobile or stationary) and the application of the machine 1.

For a mobile machine, the lower bound is for example equal to 50 miles per hour and the upper bound is equal to infinity.

If the rotation speed of the said one ring is smaller than the lower bound, the first part of the method goes back to step 21 waiting for the next start of the first part of the method during the training period.

When the xi samples are stored in the memory 15 (step 24), during a step 25, the implementing means 16 determine the value of the kurtosis of the set of vibration measurements the machine 1 is a mobile machine.

If the machine 1 is a stationary machine, the first part of the method goes from step 24 to a step 26.

If the determined value of the kurtosis is bigger than a predetermined kurtosis threshold, the first part of the method goes back to step 21.

If the determined value of the kurtosis is smaller than the predetermined kurtosis threshold, during the step 26, the first determining means 10 implement the seven algorithms ALGO1, ALGO2, ALGO3, ALGO4, ALGO5, ALGO6, ALGO7 to determine the value of each of the seven statistical parameters P1, P2, P3, P4, P5, P6, P7 from the samples xi.

The seven values of the seven statistical parameters P1, P2, P3, P4, P5, P6, P7 are stored for example in the memory 15.

The kurtosis threshold is for example equal to six.

The steps 22, 23, 24, 25, 26 are repeated until a predetermined number of values of each statistical parameters P1, P2, P3, P4, P5, P6, P7 are stored in the memory 15, for example until forty values of each statistical parameters P1, P2, P3, P4, P5, P6, P7 are stored in the memory 15.

As long as the predetermined number of values of each statistical parameters P1, P2, P3, P4, P5, P6, P7 are not stored in the memory 15 (step 27), the first part of the method goes back to step 21.

When the predetermined number of values of each statistical parameters P1, P2, P3, P4, P5, P6, P7 are stored in the memory 15 (step 27), during a step 28, the modelling means 11 model the stored values of each statistical parameter P1, P2, P3, P4, P5, P6, P7 with a normal distribution defined by the mean value of the values of the said statistical parameter and the variance of the values of the said statistical parameter.

The values of the first statistical parameter P1 are modelled by a first normal distribution having a mean value $\mu_1$ and variance $\sigma_1^2$.

The values of the second statistical parameter P2 are modelled by a second normal distribution having a mean value $\mu_2$ and variance $\sigma_2^2$.

The values of the third statistical parameter P3 are modelled by a third normal distribution having a mean value $\mu_3$ and variance $\sigma_3^2$.

The values of the fourth statistical parameter P4 are modelled by a fourth normal distribution having a mean value $\mu_4$ and variance $\sigma_4^2$.

The values of the fifth statistical parameter P5 are modelled by a fifth normal distribution having a mean value $\mu_5$ and variance $\sigma_5^2$.

The values of the sixth statistical parameter P6 are modelled by a sixth normal distribution having a mean value $\mu_6$ and variance $\sigma_6^2$.

The values of the seventh statistical parameter P7 are modelled by a seventh normal distribution having a mean value $\mu_7$ and variance $\sigma_7^2$.

During a step 29, the second determining means 12 determine the detection threshold Sd by summing the values of the first to seventh distributions included in a first interval having a lower bound equal to one minus a predetermine first quantile.

The predetermine first quantile is chosen according to the sensibility of the detection of the failure of the bearing.

The lower the predetermine first quantile is, the greater is the failure detection sensibility of the method.

The predetermine first quantile is for example equal to 80%.

Figure 7:
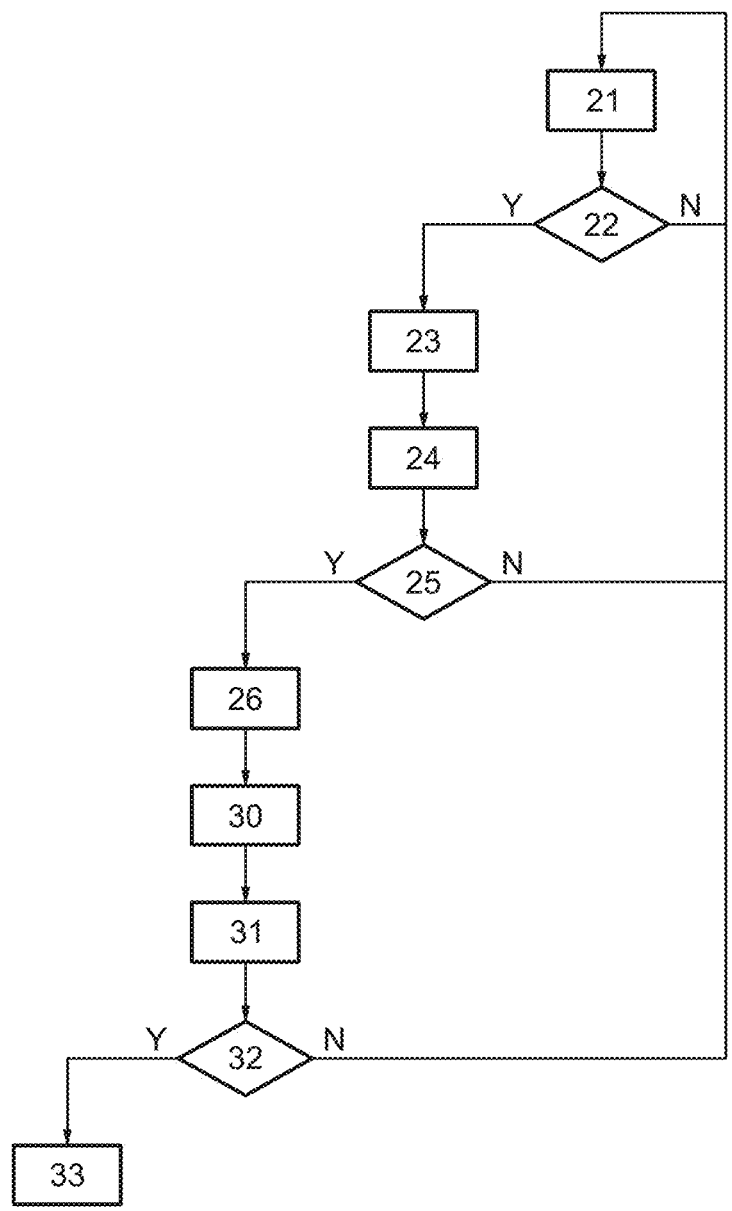

FIG. 7 illustrates an example of the second part of the method during normal operation of the machine 1 following the training period.

It is assumed that one ring of the inner and outer rings 5, 6 rotates relative to the other ring of the inner and outer rings 6, 5, the one to seventh normal distributions are determined and the detection threshold Sd is determined.

The second part of the method comprises the steps 21, 22, 23, 24, 25 and 26 if the machine 1 is a mobile machine.

If the machine 1 is a stationary machine, the second part of the method does not comprise the step 25, the second part of the method going from step 24 to step 26.

When the value of each of the seven statistical parameters P1, P2, P3, P4, P5, P6, P7 from the samples xi are determined, in a step 30, the third determining means 13 determine a score Sc from the value of each of the seven statistical parameters P1, P2, P3, P4, P5, P6, P7 and the one to seventh normal distributions determined during the training period.

The third determining means 13 perform a Z-Score normalization of each value of the statistical parameters P1, P2, P3, P4, P5, P6, P7 from the mean value and the variance of the normal distribution associated statistical parameters P1, P2, P3, P4, P5, P6, P7 to obtain a standardized value of each value of the statistical parameters P1, P2, P3, P4, P5, P6, P7.

The value of each of the statistical parameter P1, P2, P3, P4, P5, P6, P7 is noted Val1, Val2, Val3, Val4, Val5, Val6, Val7.

The standardized value of each value Val1, Val2, Val3, Val4, Val5, Val6, Val7 is noted ValS1, ValS2, ValS3, ValS4, ValS5, ValS6, ValS7.

The following equation connects each standardized value ValS1, ValS2, ValS3, ValS4, ValS5, ValS6, ValS7 to the value Val1, Val2, Val3, Val4, Val5, Val6, Val7, the mean value $\mu_1$, $\mu_2$, $\mu_3$, $\mu_4$, $\mu_5$, $\mu_6$, $\mu_7$ and the variance $\sigma_1^2$, $\sigma_2^2$, $\sigma_3^2$, $\sigma_4^2$, $\sigma_5^2$, $\sigma_6^2$, $\sigma_7^2$.

$$ValSj = \frac{Valj - \mu_j}{\sqrt{\sigma_j^2}} \tag{9}$$

with j varying between 1 and 7.

The score Sc is equal to the sum of the standardized values ValSj included in a second interval having a lower bound equal to one minus a predetermine second quantile.

The predetermine second quantile is for example equal to 90%.

During a step 31, the comparing means 14 compare the score Sc to the detection threshold Sd minus the number of standardized values included in the second interval determined at step 30.

The subtraction of the number of standardized values included in the second interval determined at step 30 permits to weight the detection threshold Sd according to the number of standardized values included in the second interval.

If the score Sc is smaller than the detection threshold Sd minus the number of standardized values included in the second interval (step 32), the bearing 4 is considered as functional. The second part of the method goes back to step 21.

If the score Sc is greater than the detection threshold Sd minus the number of standardized values included in the second interval (step 32), the bearing 4 is considered as defective and during a step 33, the comparing means 14 deliver an alarm to prevent that the bearing 4 is defective.

The method permits early prediction of damage of the bearing 4 by determining several statistical parameters from recorded vibration measurements of the bearing 4 by analysing the evolution of these parameters.

As several statistical parameters are used to predict a failure of the bearing 4, different kinds of defects of the bearing 4 may be detected.

Moreover, the detection threshold Sd is determined from vibration measurements measured on the bearing 4 in the machine 1 permitting to define the said threshold depending on the application of the machine 1 to get an accurate monitoring of the bearing 4.

What is claimed is:

1. A method for monitoring a bearing device in a machine, the bearing device comprising a bearing provided with an inner ring and with an outer ring capable of rotating concentrically relative to one another, and a vibration sensor measuring vibrations of the bearing, the method comprising the following steps:
    a. determining values of at least a first statistical parameter and a second statistical parameter from at least one set of vibration measurements delivered by the sensor during a training period following the implementation of the sensor in the machine and when the rotation speed of one of the inner and outer rings relative to the other is included in a predetermined interval,
    b. modelling the values of the first statistical parameter with a first normal distribution and modelling the values of the second statistical parameter with a second normal distribution during the training period,
    c. determining a detection threshold from the first and second normal distributions during the training period,
    d. determining a first value of the first statistical parameter and a second value of the second statistical parameter from a set of vibration measurements delivered by the sensor during normal operation of the machine and when the rotation speed of the said one ring is included the predetermined interval,
    e. determining a score during normal operation of the machine from the values of the two statistical parameters, the first and second normal distributions,
    f. comparing the score to the detection threshold, and
    g. determining the failure of the bearing according to the result of the comparison.

2. The method according to claim 1, wherein the values of at least the first statistical parameter and the second statistical parameter are determined during the training period and during normal operation of the machine if the kurtosis of the set of vibration measurements is smaller than a predetermined kurtosis threshold when the machine is a mobile machine.

3. The method according to claim 2, wherein the steps (d), (e), (f), (g) are repeated at a predetermined duration.

4. The method according to claim 3, wherein determining the detection threshold comprises summing the values of the first and second distributions included in a first interval having a lower bound equal to one minus a predetermine first quantile, the detection threshold being equal to the sum.

5. The method according to claim 4, wherein determining the score comprises:
    performing Z-Score normalization of the first value from the mean value and the variance of the first normal distribution to obtain a first standardized value,
    performing Z-Score normalization of the second value from the mean value and the variance of the second normal distribution to obtain a second standardized value, and
    summing the values of first and second standardized values included in a second interval having a lower bound equal to one minus a predetermine second quantile, the sum being equal to the score.

6. The method according to claim 5, wherein comparing the score to the detection threshold comprises comparing the score to the detection threshold minus the number of standardized value included in the second interval.

7. The method according to claim 6, wherein the bearing is considered defective when the score is greater than the detection threshold.

8. The method according to claim 7, wherein each of the first and second statistical parameters comprises:
    the root means square of the set of vibration measurements, or
    the sum of areas of identical squares, each square being defined by a diagonal connecting two vibration measurements of the set of vibration measurements, or
    the dispersion entropy of the set of measurements, or
    the permutation entropy of the set of measurements, or
    the mean value of a predetermined number of most powerful harmonics of a spectrum of the set of measurements, the first and second statistical parameters being different.

9. The method according to claim 7, further comprising defining a third statistical parameter equal to the square of the sum of the square of the first and second statistical parameters.

10. The method according to claim 1, wherein the steps (d), (e), (f), (g) are repeated at a predetermined duration.

11. The method according to claim 1, wherein determining the detection threshold comprises summing the values of the first and second distributions included in a first interval having a lower bound equal to one minus a predetermine first quantile, the detection threshold being equal to the sum.

12. The method according to claim 1, wherein determining the score comprises:
    performing Z-Score normalization of the first value from the mean value and the variance of the first normal distribution to obtain a first standardized value,
    performing Z-Score normalization of the second value from the mean value and the variance of the second normal distribution to obtain a second standardized value, and
    summing the values of first and second standardized values included in a second interval having a lower bound equal to one minus a predetermine second quantile, the sum being equal to the score.

13. The method according to claim 12, wherein comparing the score to the detection threshold comprises comparing the score to the detection threshold minus the number of standardized value included in the second interval.

14. The method according to claim 1, wherein the bearing is considered defective when the score is greater than the detection threshold.

15. The method according to claim 1, wherein each of the first and second statistical parameters comprises:

the root means square of the set of vibration measurements, or the sum of areas of identical squares, each square being defined by a diagonal connecting two vibration measurements of the set of vibration measurements, or the dispersion entropy of the set of measurements, or the permutation entropy of the set of measurements, or the mean value of a predetermined number of most powerful harmonics of a spectrum of the set of measurements, the first and second statistical parameters being different.

16. The method according to claim 1, further comprising defining a third statistical parameter equal to the square of the sum of the square of the first and second statistical parameters.

17. A bearing device comprising a bearing provided with an inner ring and with an outer ring capable of rotating concentrically relative to one another, and a vibration sensor measuring vibrations of the bearing, the bearing device further comprising:

a first determining means for determining values of at least a first statistical parameter and a second statistical parameter from vibration measurements delivered by the sensor when the rotation speed of one of the inner and outer rings relative to the other ring is included in a predetermined interval, a modelling means for modelling the values of the first statistical parameter with a first normal distribution and modelling the values of the second statistical parameter with a second normal distribution during a training period following the implementation of the sensor in a machine, a second determining means for determining a detection threshold from the first and second normal distributions during the training period, a third determining means for determining a score during normal operation of the machine from the values of the two statistical parameters, the first and second normal distributions, and a comparing means for comparing the score to the detection threshold and for determining the failure of the bearing according to the result of the comparison.

* * * * *